J. CLARK.
Damper.
No. 13,542.
Patented Sept. 11, 1855.
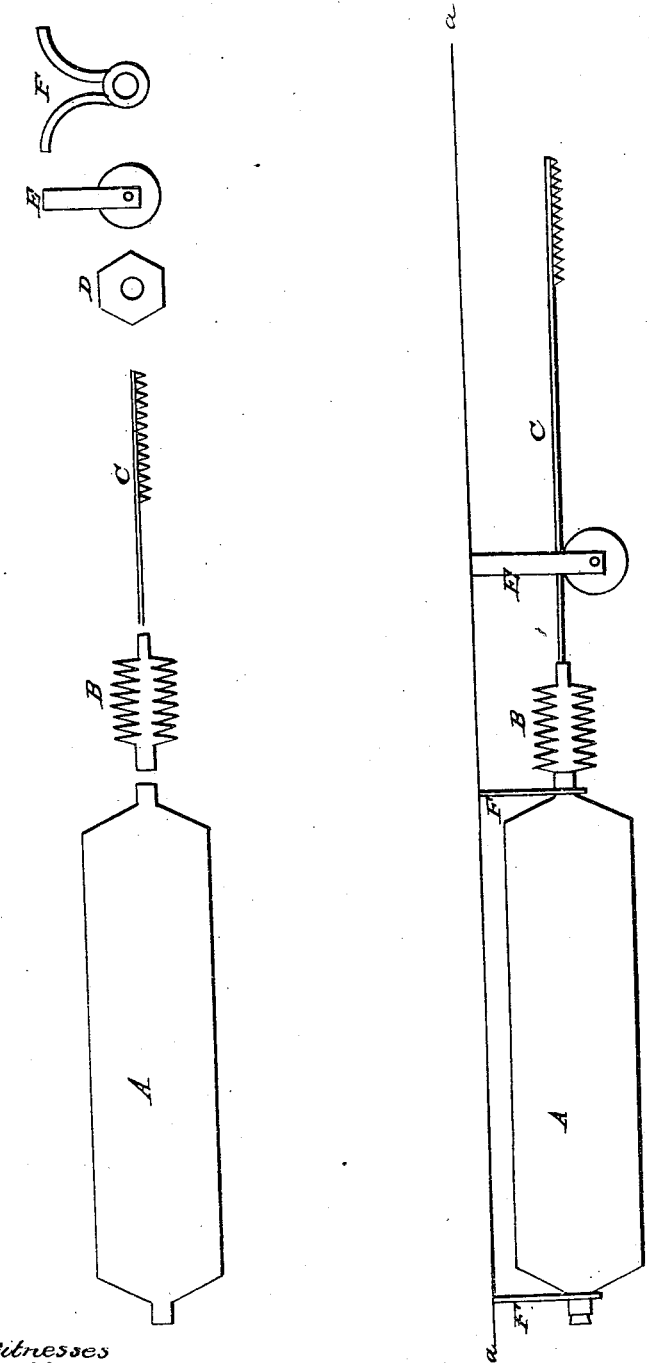
Witnesses
Cyrus Kitchen
James Anderson
Inventor
John Clark

UNITED STATES PATENT OFFICE.

JOHN CLARK, OF CAMBRIDGE TOWNSHIP, CRAWFORD COUNTY, PENNSYLVANIA.

SELF-REGISTERING VALVE FOR VENTILATION.

Specification of Letters Patent No. 13,542, dated September 11, 1855.

*To all whom it may concern:*

Be it known that I, JOHN CLARK, of Cambridge township, in the county of Crawford and State of Pennsylvania, have invented a new and useful Machine for Opening and Shutting the Valves of Ventilators and Opening and Shutting the Dampers of Stoves, &c.; and I do hereby declare that the following is a full, clear, and exact description of the construction and operation of the same, reference being had to the annexed drawings, and the description there given, which make a part of this specification.

To enable others skilled in the art to make and use my invention I refer them to the annexed drawings and descriptions.

That which I design to claim as my particular invention is—

The air tight cylinder and bellows (of whatever material they may be made) for the purpose of obtaining a motive power from the expansion and contraction of the air; and to whatever use it may be applied.

JOHN CLARK.

Witnesses:
CYRUS KITCHEN,
JAMES ANDERSON.